2,713,472

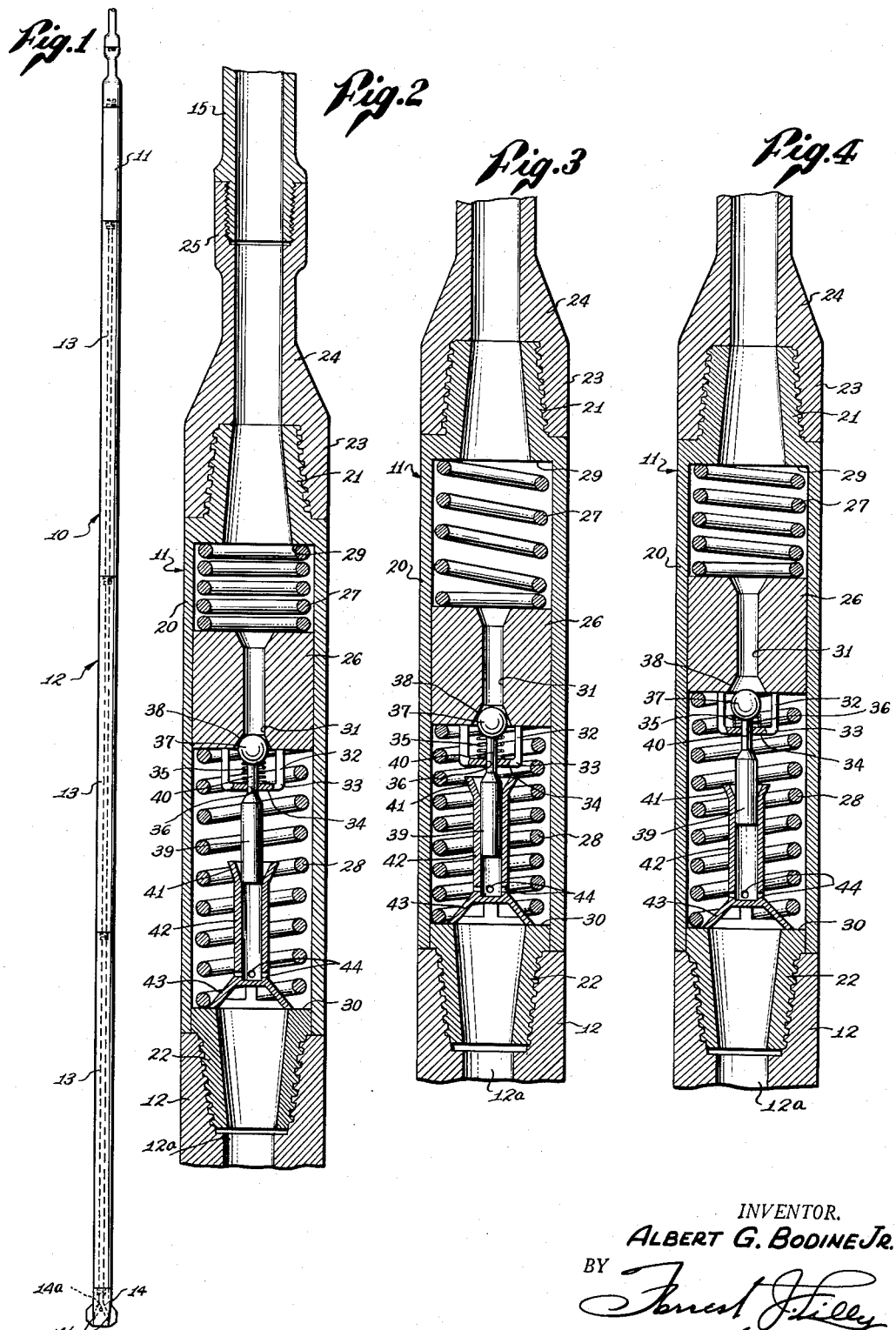

SONIC EARTH BORING DRILL WITH SELF-RESONATING VIBRATION GENERATOR

Albert G. Bodine, Jr., Van Nuys, Calif.

Original application December 11, 1950, Serial No. 200,277. Divided and this application May 11, 1951, Serial No. 225,828

5 Claims. (Cl. 255—4.4)

This invention relates generally to earth boring, and particularly to earth boring drills of the sonic type, such as disclosed in my copending application entitled Earth Boring Tool, filed December 11, 1950, Serial No. 200,277, now Patent No. 2,554,005 of which the present application is a division. Reference is also made to my original parent application Serial No. 697,235, filed September 16, 1946 and entitled Earth Boring Tool, of which said application, Serial No. 200,277, was a continuation-in-part, and in which the subject matter claimed in the present application was first disclosed. The term sonic in connection with the class of drills here referred to does not necessarily refer to audible sound, but to the fact that power is transmitted through the apparatus by elastic wave transmission which is of the nature of sound wave transmission in solid media.

Drills of the sonic type embody, generally speaking, three principal components: a bit, a relatively long elastic drill rod, connected to the bit, and an elastic wave or vibration generator connected to the drill rod. The elastic vibration generator operates to apply a longitudinal vibration force to the drill rod and thereby set up longitudinal elastic waves therein, and is operated at a frequency to resonate the rod, so that a standing wave is set up along the rod. Several modes of resonant vibration are feasible, the simplest consisting in half-wave vibration, according to which the vibration generator is operated at a frequency equal to approximately $S/2L$, where L is the length of the drill rod and S is the speed of sound in said rod. In such operation, the elastic vibration generator applies cyclic longitudinal vibration forces on the rod at the fundamental resonant frequency of the rod, and the rod is set into resonant elastic half-wave vibration in a longitudinal direction. The rod alternately elongates and contracts, the two ends of the rod vibrating oppositely, while an intermediate portion stands substantially stationary. In other language, velocity anti-nodes are found at the two ends, and a velocity node at the center. The bit on the lower end of the longitudinally elastically vibrating rod acts against the hole bottom, causing the formation to undergo an elastic vibration, and the formation gives way under the bit, apparently by elastic vibration fatigue failure. For a more complete discussion of such a sonic drill, see my aforesaid application Serial No. 200,277.

Overtone modes of resonant longitudinal vibration are also possible, and are sometimes of advantage. For example, with a vibration frequency double that heretofore mentioned, i. e., $S/L$, full wave length resonant standing wave vibration is attained. In this case, velocity antinodes are found at the two ends of the rod and at the middle, and velocity nodes appear midway between the anti-nodes. With many types of elastic vibration generators, for instance, the mud driven turbine types disclosed in my aforesaid applications, it is difficult to attain these overtone modes. As the apparatus is brought gradually up to speed, as by gradually increasing the speed of the mud pump at the ground surface, the vibratory rod tends to resonate strongly when the fundamental frequency is reached, often "locking in" at the frequency. This occurs when the vibratory rod is permitted to build up to substantial vibration amplitude at the resonant frequency, after which increased mud velocity, up to the maximum capacity of the mud pumping installation, is incapable of further increasing the speed of the turbines. Similar effects are inevitable with electric or mechanical drive so long as the vibration generator responds to increased motive power by increase in frequency.

An object of the invention is accordingly the provision of a sonic drill having a vibration generator which will respond to increased motive power by an increase in power output but not by an increase in speed or frequency.

A further object is the provision of a sonic drill having a vibration generator of such characteristics as will readily start vibrating at a frequency above the fundamental frequency mode of the elastic drill rod and will readily approach and lock in at a desired overtone frequency mode of the rod.

The invention provides a sonic drill having a vibration generator possessed of its own natural resonant frequency. A vibration generator having its own natural resonant frequency will substantially alter the operation of the system as compared with non-self-resonant generators, in that adjustment of the motive power at the ground surface will only change the force of each cycle of operation of the generator, i. e., the power going into the drilling action, and will not vary the frequency of operation of the generator. Power adjustment is of course much less critical than is frequency adjustment. Therefore, a generator which self regulates itself to a predetermined frequency, and which responds to increased motive power input solely in terms of power output, is often of substantial advantage in simplicity of operation as compared with a generator whose frequency of operation varies with motive power input. It is better if the operator does not have to be careful to keep the system "in tune." The present invention accordingly provides an elastic vibration generator comprising a self-resonant mechanical oscillator. A mechanical oscillator is a vibratory device or system possessed of both "stiffness" and mass. In such a system, the mass, when displaced a given distance $x$ from an equilibrium position, is acted on by a force F expressed by the equation $F=-Kx$ where K is the stiffness constant. Having displaced the mass from its equilibrium position, if it then be released, it will oscillate at a resonant frequency $f$ given by the equation $$f = \frac{\sqrt{K/m}}{2\pi}$$

where $m$ is the vibratory mass. An oscillator to which power is supplied to maintain the vibration amplitude at a steady state is customarily known as a driven oscillator. The power driven oscillator used in the invention, various examples of which are known in the art, and one novel form of which will be described hereinafter, is so tuned that its own resonant frequency corresponds to the desired resonant frequency of the elastic drill rod. Of course, a precise match of resonant frequencies is not required. It is sufficient if the oscillator is designed to be mechanically operable within the range of the desired resonant frequency operation of the rod, and to possess a resonant frequency of its own which is near that frequency range. And in this connection, it is to be understood that when I refer to the resonant frequency of the rod, I do not refer to the precise frequency for peak resonance, but to a frequency range within which substantial vibration amplitude magnification is obtained by resonant phenomena, as more fully explained in my aforesaid application Serial No. 200,277.

A self-resonating vibration generator for a sonic drill thus has two principal advantages viz., responsive to motive power in terms of power output with automatic maintenance of frequency, rather than by variation in frequency, and the capability for being designed to start and continue to run at any selected overtone frequency of the elastically vibratory rod.

The invention will be more fully understood from the following detailed description of a present illustrative embodiment thereof, reference for this purpose being had to the accompanying drawings, in which:

Figure 1 is an elevational view of a sonic drill in accordance with the invention;

Figure 2 is a longitudinal sectional view through the vibration generator of the drill of Figure 1; and Figures 3 and 4 are views similar to Figure 2, but showing different positions of operation.

In the drawings, the sonic drill of the invention is designated generally by the numeral 10, being made up of an elastic vibration generator 11, an elastic longitudinally vibratory bar structure or rod 12, here shown to consist of a plurality of intercoupled steel drill collars 13, and a bit 14 connected to the lower end of lower collar 13. The lower end portion of a conventional drill pipe string is indicated at 15, and it will be understood that this drill string is suspended from the ground surface by any usual ground surface suspension equipment, preferably including a rotary drilling table, not necessary to illustrate or describe herein. It may be mentioned that while I prefer to support the drill string from a conventional drill rig using a rotary table, the drill of the present invention is not rapidly rotated as in ordinary rotary drilling, though it is desirable to have a slow rotation or oscillation merely for the purpose of slowly moving the blades of the bit over the hole bottom.

Vibration generator or oscillator 11, in the present illustrative embodiment, comprises a housing or body 20, here shown as cylindrical, having at its upper end lower ends threaded pins 21 and 22 adapted for connection with a coupling box 23 on the lower end of an adapter 24 coupled at 25 to the lower end of drill pipe string 15, and with a threaded box in the upper end of drill collar rod 12, respectively. Inside of generator housing 20 a heavy mass element or piston 26 is slidably mounted between two heavy coil springs 27 and 28. Upper spring 27 seats at its upper end against an internal annular shoulder 29 in body 20 and at its lower end on the upper face of piston 26. Lower spring 28 seats at its lower end on internal annular shoulder 30 formed in housing 20, and at its upper end against the lower face of piston 26. Piston 26 and springs 27 and 28 thus provide, a mechanical oscillatory system capable of vertical oscillation at a natural resonant frequency about a centralized equilibrium position for the piston 26.

The vibration generator is power driven by the flow of rotary mud fluid pumped down through drill string 15 and adapter 24 from conventional mud pumping equipment at the ground surface, unnecessary to illustrate herein. This mud fluid passes through hollow adapter 24 into the upper end of body 20, and is discharged from the lower end of said body into circulation passage 12a extending downwardly through drill collar rod 12, the bit 14 also being understood to have a circulation passage 14a and mud discharge ports 14b through which this mud fluid circulated down through the system is discharged to the bore hole to perform its usual functions. This mud stream in passing through the generator acts to reciprocate generator piston 26, and in the present illustrative embodiment a valve means is incorporated in or carried by the piston, although this is not necessarily the case and the valve means may be mounted independently of the piston. As here shown, however, a vertical passage 31 through piston 26 is provided to permit the flow of mud fluid from the upper portion of generator housing 20 to the lower portion thereof. A cage 32 is attached to the lower face of piston 26, preferably by welding. Cage 32 consists of a pair of downwardly extending legs 33 which support at their lower ends a small plate 34, the upper surface of which supports a valve spring 35, and the center of which is provided with a hole 36. Valve spring 35 supports a spherical valve member 37, which seats against a conical valve seat 38 at the lower end of piston passage 31. A vertically disposed cylindrical plunger 39 is connected to valve member 37 by means of a shank 40 which is of sufficiently reduced cross-section to pass freely through the hole 36 in cage plate 34. The lower end of plunger 39 is received into the flared opening 41 of a vertically positioned dash pot 42 which is supported at its lower end on a cage 43 attached to the upper end of tool joint fitting 22. Preferably, dash pot 42 is provided with several small openings 44 near its lower end.

The manner in which the downward flow of fluid causes piston 26 to reciprocate within the generator case may be understood from a description of one cycle of operation, three steps of which are illustrated in Figures 2, 3 and 4.

Figure 2 shows piston 26 displaced from a position of rest to an extreme upward operating position with the piston passage 31 closed by valve 37. In actual drilling operations the piston may be caused to be thrown into this position for starting purposes by bouncing the drill string against the bottom of the drill hole. Once having assumed the extreme upward position shown in Figure 2, piston 26 is urged downwardly by spring 27, which in this position is compressed, and by pressure applied against the upper surface of the piston 26 by the mud fluid flowing into generator case 20 through its upper pin 21. Valve member 37 is initially prevented from opening and permitting the free passage of fluid through piston passage 31 because of its own inertial resistance to the downward acceleration and because of upward pressure applied by valve spring 35. The inertial effect of the weight of valve 37 together with the attached connecting shank and plunger is enhanced by the dash pot 42 during the first half of the downstroke.

In Figure 3 the generator is shown with the piston 26 approximately at its mid way position on its down stroke. As the piston moves downwardly, it first accelerates to reach maximum velocity at a midway position and then decelerates as it approaches the extreme lower position. This deceleration is caused by the compression of lower spring 28. This deceleration would ordinarily cause valve 37 to leave its seat 38 soon after the midpoint of the down stroke and permit the passage of fluid through piston 26, but this tendency is prevented by the action of plunger 39 in dash pot 42. After a moment of hesitation at the extreme downward position, piston 26 begins to move upward under the pressure of compressed spring 28. As this upward movement occurs, valve seat 38 separates from valve 37, releasing the pressure of fluid on the upper surface of piston 26, and thus permitting an increase in its upward acceleration.

Figure 4 shows piston 26 a little past the midway position on its upstroke. Valve 37 is seen to be lagging piston 26 so as to compress valve spring 35, and to permit the free passage of fluid through the piston passage 31 into the lower portion of the generator case, from which it flows out at the bottom through coupling pin 22. After the piston passes the midpoint of its upward travel, however, it is steadily decelerated by upper spring 27. Valve 37, which does not experience this decelerating force, has sufficient inertia and experiences sufficient upward acceleration from valve spring 35 to overcome the resistance of the downward pressure of fluid in passage 31 and the slowing effect of dash pot 42 so as to move into a closing position against seat 38 as the piston comes to a standstill at its extreme upward position as seen in Figure 2, thus completing the cycle.

The described vertical reciprocation of the piston 26 reacts on the generator housing and parts connected thereto to effect a vertical reciprocation of said parts, the amplitude of displacement being of course much less than that of the piston because of the much greater mass.

The frequency with which the generator piston is reciprocated is determined primarily by the mass of the piston and the stiffness or elasticity of the springs, with some modification automatically resulting from any slight difference of frequency for the resonance of the drill rod on which the case 20 is mounted, variation in fluid pressure having only a minor effect, if any, on frequency. As fluid pressure and velocity is increased, the amplitude of displacement increases, and increased power is delivered from the fluid stream to the reciprocating piston. As already mentioned, the amplitude of displacement of generator case 20 including all directly attached mass is substantially less than the amplitude of displacement of the piston, the exact ratio depending upon respective masses and being governed by the laws of momentum. This reactive relation results from the springs acting as an acoustic lever. When a spring is coupled between two unequal reciprocating masses, it automatically balances the kinetic forces so that the greater mass moves through the lesser amplitude.

This generator device converts the relatively small vibratory force of the high velocity but small mass fluid-driven piston, traveling through a substantial displacement amplitude, into relatively great vibratory force exerted on the heavy generator housing and case and the connected elastic drill collar rod, where the displacement amplitude is relatively small.

The vibration generator or mechanical oscillator as thus described will be seen to have a natural resonant frequency of its own, largely determined by the mass of the piston 26 and the elasticity constants of the springs 27 and 28, making it difficult to drive the piston at any other frequency. In practice, therefore, the resonant frequency of the generator is matched or adjusted by design to the desired longitudinal resonant frequency of the elastic drill collar rod 12. As already mentioned, the drill collar rod will have several possible modes of longitudinal vibration, the fundamental and overtones. It is accordingly possible to adjust the natural resonant frequency of the oscillator to either the fundamental resonant frequency of the drill collar rod, or to any overtone. In practice, it is not essential that the natural resonant frequency of the oscillator be precisely matched to the exact peak resonant frequency of the drill collar rod. It is sufficient if the generator be mechanically designed so that it can operate within the frequency range desired of the drill collar rod, and that the natural resonant frequency of the oscillator be within or near that frequency range.

With this adjustment, flow of the mud fluid through the oscillator will then always, no matter what the mud fluid pressure, drive the oscillator at a frequency within the resonant frequency range of the vibratory rod, and increasing mud fluid pressure will drive the oscillator at increasing amplitude and power, but will not substantially vary its frequency. Actually, the resonant reaction of the drill rod will shift the frequency of the oscillator, if it is slightly different, so that the combined system operates as a single complex resonant circuit. As already explained the resonant frequency for the oscillator may be made to correspond with either the fundamental resonant frequency of the vibratory rod (half wave operation) or an overtone, for example, full wave operation. Assuming that it is desired to drive the vibratory drill collar rod at its first overtone, or in other words, to operate it as a full wave device, the oscillator is designed to have its own resonant frequency in the range of the frequency for full wave operation of the drill collar rod. No difficulty is then encountered in bringing the oscillator up to power, since it will not tend to "lock in" at the fundamental frequency operation of the drill collar rod. On the contrary, the beginning tendency of the oscillator will be to operate at its resonant frequency, which is the desired frequency of operation of the drill collar rod.

In operation, the mud fluid stream delivered under pressure from the mud pump at the ground surface thus drives the oscillating mass or piston of the oscillator, and the vibration frequency of this piston is governed by the natural resonant frequency of the piston and spring combination, as described. Increase in mud pressure and velocity increases the amplitude of the piston, and the power delivered to the system, but has only a minor effect, if any, on the frequency of oscillation. The oscillating piston exerts a vibratory reactive force on the generator case and the upper end of the elastic drill collar rod, and this vibratory force sets up longitudinal elastic waves of compression and tension in the drill collar rod. Since the oscillator is tuned to the desired longitudinal resonant frequency of the drill collar rod, that is to say, its own resonant frequency corresponds to the desired resonant frequency of the rod, the vibratory forces exerted by the oscillator on the rod tend to establish a longitudinal resonant elastic standing wave in the rod. Assuming the case of a system designed for fundamental frequency vibration, the upper and lower ends of the rod will move oppositely to one another, through a small displacement, while the center section of the rod will remain substantially stationary, the two half sections of the rod elastically elongating and contracting in unison. In other words, velocity anti-nodes are found at the two ends of the rod, and a velocity node at the midpoint. For a rod designed for full wave vibration, velocity anti-nodes are found at the two ends and at the center section, and velocity nodes appear half way between the anti-nodes. The bit connected to the lower end of the vibratory rod accordingly vibrates in engagement with the formation, causing the formation to vibrate responsively, and the formation to give way, apparently by elastic fatigue. Because of the great mass set into vibration by the oscillator, the displacement amplitude of the rod, and of course of the bit, is very small as compared with displacement amplitude of the oscillating piston of the oscillator, but a corresponding gain in force results from this reduction in displacement amplitude, and the bit accordingly works against the formation with application of great force. The oscillator and rod combination is accordingly a velocity reducing, force gaining device by which a relatively low pressure but high velocity mud fluid stream can be utilized for drilling the very hard formation. In terms of acoustics, the mud fluid stream is a motive power source of low impedance, while the very hard formation requires power at high impedance in order to set into responsive vibration, as is desired. The oscillator as described functions as an impedance adjusting device, being capable of receiving power at low impedance and delivering power to the formation at high impedance.

Referring again to the self-resonating characteristic of the oscillator, it will be seen that this oscillator automatically frequency-regulates itself to the desired resonant frequency of the drill collar rod. Increased mud fluid pressure and velocity increases the power of the system, but without varying its vibration frequency. It is accordingly possible to deliver any desired power, within the upper limit of the oscillator, to the equipment at the resonant frequency of the drill collar rod. Also, in cases wherein operation at an overtone frequency is desired, the oscillator will automatically operate at the overtone frequency, and the difficulty encountered with non-self-resonant generators in bringing them up to speed past the fundamental frequency of the drill collar rod is entirely eliminated.

In the operation of the system, the natural resonant frequency of the oscillator may be modified slightly by the resonant frequency of the drill collar rod. That is to say, there is some reactive coupling back from the rod which has an effect on the freedom of oscillation of the oscillator case. This, in turn, reacts on the mass or piston within the oscillator, tending to shift its natural frequency slightly. This mutual coupling effect, however, has the desirable tendency to link the two resonant devices together so that the generator operates with good efficiency at an automatically determined frequency.

It will be understood that the drawings and descriptions are for illustrative purposes only and that various changes in design, structure and arrangement may be made without departing from the spirit and scope of the invention, as defined in the appended claims.

I claim:

1. Apparatus for drilling a bore hole in the earth having in combination: a bit for applying vibratory drilling action on the bottom of said bore hole, an elongated massive rod drivingly coupled to the upper end of said bit, and an elastic vibration generator drivingly coupled to said rod, said generator embodying a housing coupled to said rod and having therein a mass oscillating in a direction longitudinally of said rod between two springs supported therein, said mass and springs being tuned to have a resonant frequency near a resonant frequency of said rod for a selected longitudinal mode of elastic vibration of said rod, said vibration generator being arranged to receive drilling fluid from a drill pipe string suspended in the bore hole, and including means powered by said drilling fluid for oscillating said mass and springs, whereby the bit will be vibrated by cyclic motion of the end of said rod in response to resonant frequency vibrations imparted to said rod by said generator.

2. Apparatus according to claim 1, wherein said mass comprises a piston reciprocable in a longitudinal cylinder space in said housing, said housing having a fluid inlet, a fluid outlet, and a fluid passage therebetween including said cylinder space, and a valve in said fluid passage operable by the fluid stream to intermittently subject said piston to the pressure of said fluid stream.

3. Apparatus according to claim 1, wherein said mass comprises a piston reciprocable in a longitudinal cylinder space in said housing, said housing having a fluid inlet, a fluid outlet, and a fluid passage therebetween including said cylinder space, and a valve in said fluid passage operable by the piston to intermittently subject said piston to the pressure of said fluid stream.

4. Apparatus according to claim 1, wherein said mass comprises a piston reciprocable in a longitudinal cylinder space in said housing, said housing having a fluid inlet, a fluid outlet, and a fluid passage therebetween including said cylinder space, and a valve in said piston operable in response to reciprocating motion of the piston to intermittently subject the piston to the pressure of the fluid stream.

5. Drilling apparatus comprising in combination: an elongated elastic bar structure longitudinally elastically vibratory at a resonant frequency, a bit on the lower end of said bar structure, and a power driven generator operatively connected to said bar structure for applying cyclic longitudinal vibration forces to said bar structure at the selected resonant frequency of said bar structure, said generator comprising elastic, mechanical, oscillatory means connected to said bar structure, said oscillatory means having a normal position of equilibrium, power means operatively connected to said oscillatory means to oscillate said oscillatory means whereby said generator provides a self-resonant mechanical oscillator and whereby the oscillatory means will move in and out of the position of equilibrium to generate the desired frequency of vibration in said bar structure.

References Cited in the file of this patent

UNITED STATES PATENTS 2,554,005   Bodine   May 22, 1951